US005852419A

United States Patent [19]

Yujiri et al.

[11] Patent Number: 5,852,419

[45] Date of Patent: Dec. 22, 1998

[54] ROTATING MIRROR DRUM RADIOMETER IMAGING SYSTEM

[75] Inventors: Mikio L. Yujiri, Torrance; Michael S. Mussetto, Glendale; Gerald P. Uyeno, Palos Verdes, all of Calif.

[73] Assignee: TRW Inc., Redondo Beach, Calif.

[21] Appl. No.: 605,414

[22] Filed: Feb. 22, 1996

Related U.S. Application Data

[63] Continuation-in-part of Ser. No. 160,981, Oct. 7, 1992, Pat. No. 5,534,874.

[51] Int. Cl.[6] .................... G01S 3/02

[52] U.S. Cl. .................... 342/351

[58] Field of Search .................... 342/351; 359/220, 359/221; 343/761, 763, 766; 324/76.14; 356/216

[56] References Cited

U.S. PATENT DOCUMENTS 3,916,416 10/1975 Lewis .................... 343/756

OTHER PUBLICATIONS

Lo et al., "A W–Band Direct–Detection Radiometric Imaging Array," *IEEE 1994 Microwave and Millimeter–Wave Monolithic Circuits Symposium,* pp. 41–44.

*Primary Examiner*—Theodore M. Blum

*Attorney, Agent, or Firm*—Michael S. Yatsko

[57] ABSTRACT

A rotating mirror drum radiometer imaging apparatus. The apparatus generally comprises a two-sided mirror, a drum for securely supporting the two-sided mirror therein at an angle of preferably about 45 degrees relative to a longitudinal axis of symmetry extending through the drum, support walls for supporting the drum for rotational movement, and a motor and drive wheel for rotationally driving the drum. In one embodiment the drum includes first and second cut-outs in a side surface thereof. The cut-outs are further spaced preferably about 180 degrees from each other about the longitudinal axis of symmetry and enable a transmitted signal to be alternately received therethrough by first and second sides of the two-sided mirror as the drum and mirror are concurrently rotated by the motor and drive wheel. A first antenna is disposed adjacent a first end of the drum and a second antenna is disposed adjacent a second end of the drum. The first and second antennas, either dish antennas or an imaging array, alternately receive the signal as the signal is alternately reflected from the first and second sides of the mirror as the mirror is driven rotationally. Thus, both sides of the mirror are used to thereby effectively double the number of image scans obtainable for any given rotation rate of the mirror. The apparatus is particularly effective for high altitude imaging applications where the speed of an airborne platform may be quite high, thus necessitating a correspondingly high mirror rotation rate. The increased rotation rate of the mirror provided by the apparatus further allows higher refresh rates compared to heretofore designed scanning antenna systems.

2 Claims, 2 Drawing Sheets

ROTATING MIRROR DRUM RADIOMETER IMAGING SYSTEM

CROSS REFERENCE TO RELATED APPLICATIONS

This application is a continuation-in-part of patent application Ser. No. 08/160,981, filed on Oct. 7, 1992, assigned to the same assignee as the assignee of the present invention, now U.S. Pat. No. 5,534,874.

BACKGROUND OF THE INVENTION

1. Field of the Invention

This invention relates generally to imaging systems, and more particularly to a rotating mirror drum radiometer imaging apparatus incorporating a two-sided mirror which alternately reflects a received signal from the two sides thereof to independent antennas as the mirror is rotated about a longitudinal axis extending therethrough.

2. Description of the Prior Art

Millimeter wave radiometers have been used as sensors in a variety of imaging systems. Typically, a single form of detector is used with some type of focusing element, such as a lens or a dish antenna, and a rotating or oscillating mirror and imaging system. The mirror is typically mounted at its center at some angle relative to the rotating shaft. Accordingly, only one side of the mirror is used to receive the signal and to reflect the signal therefrom.

In operation, as the rotating mirror rotates, it spins in a way that aims the view of the antenna along a path that rotates around the rotational axis of the mirror. An analogous arrangement is used by a lighthouse beacon light reflecting from a spinning mirror which aims the light at the horizon. In such applications the light beam appears to rotate around the lighthouse. With the radiometer, however, instead of sending out a signal it receives a signal from the mirror.

If the radiometer is mounted on a moving platform, such as a helicopter, with the mirror rotation axis in the direction of travel, a two-dimensional image can be obtained. One dimension of the image is formed as the mirror rotates the antenna aim at the different points along a circular arc. The second dimension of the scene is formed by the movement of the platform which causes the antenna to image a different circular arc for each rotation of the mirror.

While the above-described imaging radiometer works adequately for modest platform speeds and antenna aperture sizes, it would nevertheless be highly desirable in certain applications, such as high altitude imaging from an airborne platform, to increase the mirror rotation rate beyond that normally obtainable with heretofore developed imaging systems. For example, where the speed of the moving platform is quite high, the mirror rotation rate must be increased proportionally to ensure adequate coverage of the scene by the imaging system. Additionally, higher altitudes require that the antenna size be increased to improve the spatial resolution of the image. If the rotation rate of the mirror is increased and/or if the antenna size increases, then the apparatus needed to rotate the mirror at the necessary speed becomes exceedingly complex and/or large.

Another problem inherent in previously designed scanning imaging systems is their limitation in radar applications. Presently, scanning systems rely on rotating an entire antenna assembly to provide for sweeps of a scene. This requires rotating the entire antenna assembly on a rotating joint in a waveguide feed of the antenna assembly. With large antennas, careful balancing of the dish and feed horns is required even for moderate rotation rates. Higher rotation rates for faster screen refresh rates are even more difficult to achieve with presently developed scanning antenna systems.

Accordingly, it is a principal object of the present invention to provide a radiometer imaging apparatus which is capable of providing an even faster refresh rate and better image resolution than from heretofore developed imaging systems.

It is another object of the present invention to provide a radiometer imaging apparatus which includes a mirror capable of doubling the scene scans of any image at any given rotation rate of the mirror.

It is yet another object of the present invention to provide a radiometer imaging apparatus which provides for increased mirror rotation rates, and which enables larger antenna apertures to be employed than heretofore possible.

It is yet another object of the present invention to provide a radiometer imaging apparatus which is particularly well balanced even at relatively high rotation rates and which is particularly well suited for radar imaging applications on high speed platforms, such as helicopters and airplanes.

It is yet another object of the present invention to provide a radiometer imaging apparatus which may be constructed from widely available materials and components.

SUMMARY OF THE INVENTION

The above and other objects are accomplished by a rotating mirror drum radiometer imaging apparatus in accordance with preferred embodiments of the present invention. The apparatus generally comprises two-sided mirror means for reflecting a received signal; mounting means for fixedly supporting the two-sided mirror means, wherein the two-sided mirror means is placed at an angle of preferably about 45 degrees relative to a longitudinal axis of symmetry extending through the mirror means; and means for rotating the mounting means to thereby cause the two-sided mirror means to rotate about the longitudinal axis of symmetry of the mounting means.

In one embodiment the mounting means comprises a drum having first and second cut-outs spaced approximately 180 degrees from each other about the periphery of the drum. The cut-outs are further aligned generally longitudinally on the first and second sides, respectively, of the two-sided mirror means to lie vertically aligned with one another. Accordingly, as the drum is rotated the incoming signal may alternately pass through both cut-outs and be reflected alternately from both sides of the two-sided mirror means. Thus, two image scans are provided for each revolution of the two-sided mirror means.

First and second antenna means are also preferably included and may be disposed generally perpendicular to the longitudinal axis of symmetry and adjacent first and second ends of the drum for receiving the signals reflected from both sides of the two-sided mirror. The drum and means for rotating the drum are preferably secured to a mounting platform, which in turn may be secured to a suitable exterior surface of a land based platform or, alternatively, a suitable platform of a helicopter or airplane.

The drum in one embodiment may be mounted for rotation within the mounting means by bearings disposed on a periphery of the drum at the ends of the drum. In an alternative embodiment, rotation of the drum is accomplished by axles mounted to opposite end walls of the drum. In both embodiments, the apparatus forms a relatively compact radiometer imaging system which may be used in a wide variety of land based or airborne applications.

The apparatus of the present invention provides a significant improvement in the refresh rate of images and/or signals because two images are received with each revolution of the two-sided mirror means. Previously designed systems have only been able to provide a single image per revolution of the receiving element (i.e., the mirror). The apparatus of the present invention thus effectively doubles the refresh scan rate for any given rotational speed of the two-sided mirror means.

A further advantage provided by the apparatus of the present invention is the ability to provide an acceptable refresh scan rate when the apparatus is mounted to an airborne platform moving at a very high speed. Previously designed systems were limited in providing acceptable refresh rates for received signals, and thus acceptable imaging of the received signals, because of the generally high rotational speeds at which the mirrors of such systems had to be rotated in relation to the speed of the airborne vehicle. The present invention overcomes this obstacle by providing two scans of an image or signal for each revolution of the two-sided mirror means. This enables the apparatus to provide quality imaging of a scanned image signal when mounted to an airborne vehicle traveling at relatively high speeds.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE INVENTION

Figure 1:
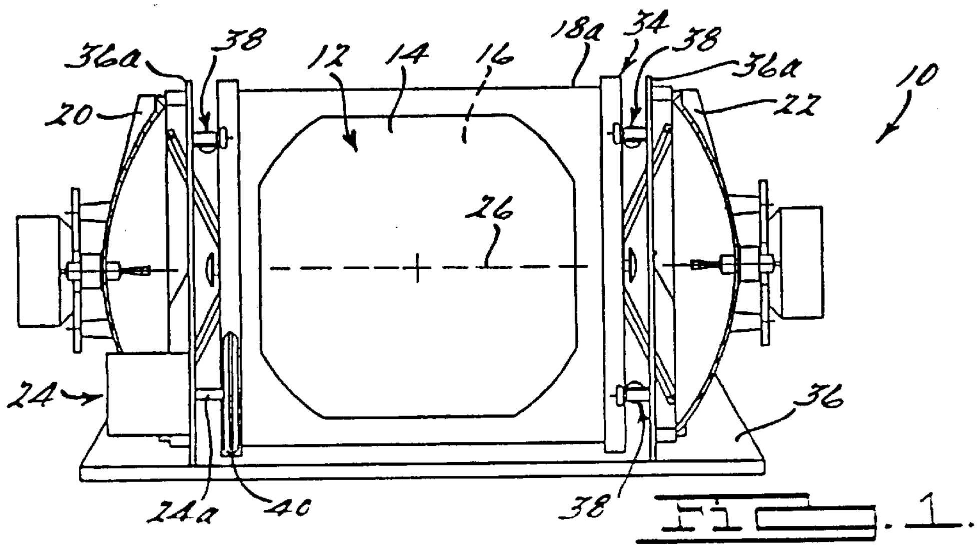
FIG. 1 is a side elevational view of a rotating drum radiometer imaging apparatus in accordance with one embodiment of the present invention showing the antennas of the apparatus in cross section.

Referring to FIGS. 1 though 3, there is shown a rotating mirror drum radiometer imaging apparatus 10 in accordance with one embodiment of the present invention. With specific reference to FIG. 1, the apparatus 10 generally comprises two-sided mirror means in the form of a generally flat mirror 12 having a first reflective side 14 and a second reflective side 16; a mounting means in the form of an open ended drum 18 for mounting the mirror 12 therein; first antenna 20; second antenna 22; and motor means in the form of a motor 24 for rotating the drum 18 rotationally about a longitudinal axis of symmetry 26 of the drum 12.

For simplicity, the first antenna 20 and the second antenna 22 are shown on the drawing as dish type antennas. However, as will be discussed in detail below, various other types of antennas, such as, a one dimensional imaging array, as discussed below, are also considered to be within the broad scope of the present invention.

Figure 2:
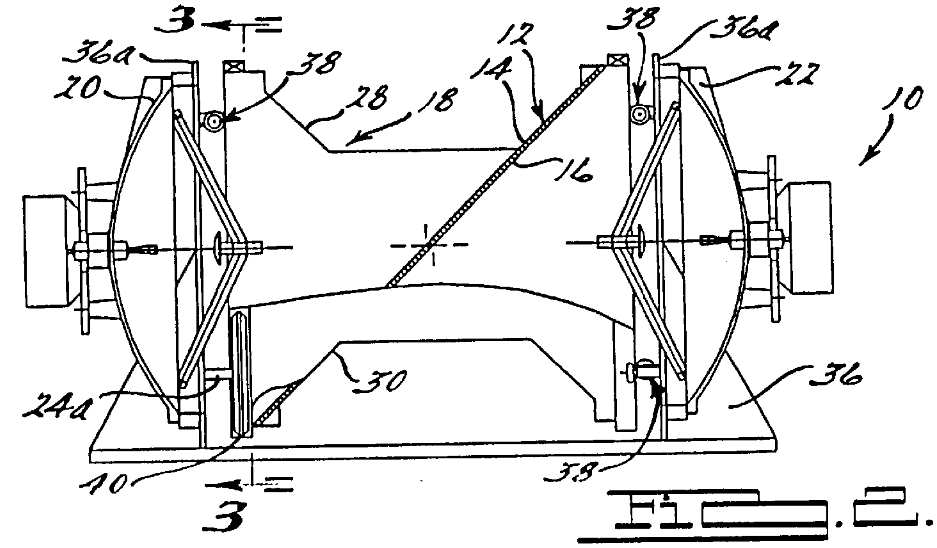
FIG. 2 is a cut-away view of the apparatus of FIG. 1 with the drum of the apparatus rotated 90° from the orientation shown in FIG. 1.

With specific reference to FIG. 2, the mirror 12 is mounted fixedly within the drum 18 and disposed so as to intersect the longitudinal axis of symmetry 26 at preferably a 45° angle. A first cut-out 28 and a second cut-out 30 are formed in a side surface 18*a* of the drum 18. The second cut-out 30 is further positioned preferably about 180 degrees about the axis 26 from the first cut-out 28. The first and second cut-outs 28 and 30, respectively, are further longitudinally aligned so as to open preferably directly above one another on the drum 18. Accordingly, received signals and/or images may pass through the cut-outs 28 and 30, alternately, and be reflected from the first and second sides 14 and 16, respectively, of the mirror 12 as the drum 18 rotates.

Various configurations of the antennas 20 and 22 may be utilized with the present invention. For example, in the embodiment of the invention shown in FIGS. 1 though 3 (but not illustrated in FIG. 3 for purposes of clarity), the first and second antennas 20 and 22 may each be formed as a well known Cassegrain dish antenna having an aperture diameter of preferably about two feet, and disposed fixedly at opposite ends 32 and 34 of the drum 18.

It is also contemplated that various imaging arrays be utilized for the antennas 20 and 22. For example, one dimensional arrays of millimeter wave (MMW) receivers which may incorporate a focusing element, such as a lens, may be disposed at each end of the rotating drum 18. Such a configuration provides "pushbroom" type scanning and is described in detail in *A W-BAND DIRECT-DETECTION RADIOMETRIC IMAGING ARRAY,* by D. C. W. Lo, L. Yujiri, G. S. Dow, T. N. Ton, M. Mussetto and B. R. Allen, IEEE 1994 Microwave and Millimeter-Wave Monolithic Circuits Symposium, pages 41–44, hereby incorporated by reference. The use of "pushbroom" type scanning provides a full two-dimensional image with each half rotation of the drum (or two images for each rotation of the drum 18).

The antennas 20 and 22 are normally aligned longitudinally with each other along the longitudinal axis of symmetry 26 of the drum 18 and supported fixedly relative to the drum 18 by mounting members 20*a* and 22*a* secured thereto and to a portion of a mounting platform 36. If the pushbroom type scanning configuration is utilized, the arrays may be offset relative to one another, for example, by half the spacing between the receivers in one array. By offsetting the arrays, two sets of images from each array can be merged to form an image with twice the sampling period of either set alone, thus enhancing the quality of the image.

The drum 18 may be mounted for rotational movement by conventional bearings 38, as illustrated by way of example in FIG. 2. The bearings 38 are disposed along the periphery of the drum 18 at its ends 32 and 34 and mounted to vertical support walls 36*a* to support the drum 18 rotationally and elevationally above platform 36.

The apparatus 10 may be secured as a single structure via its mounting platform 36 to a permanently located land based mounting platform for land based use or, alternatively, to some suitable exterior surface of an airborne vehicle, such as a helicopter or an airplane. The mirror 12, being supported at both of its ends rather than at its center as with conventional imaging systems, is significantly better balanced and more stable, even when the mirror is being rotated at relatively high speeds, as compared with previously designed imaging systems. Moreover, the spinning mirror 12 can easily be precision balanced via counter weights disposed at suitable positions on the drum 18.

Figure 3:
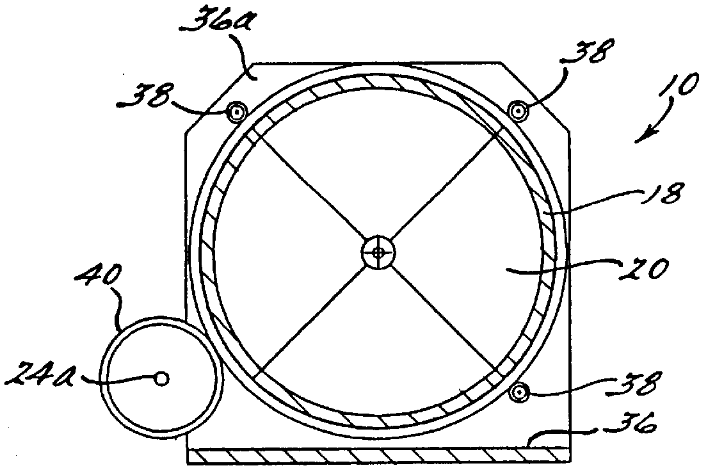
FIG. 3 is a cross-sectional view of the apparatus of FIGS. 1 and 2 in accordance with section line 3—3 in FIG. 2.

With further reference to FIGS. 1–3, the apparatus 10 includes a drive wheel 40 positioned to abuttingly engage a portion of the drum 18 and coupled to an output shaft 24*a* of the motor 24. The drive wheel 40 is driven by the output shaft 24*a* of the motor 24 rotationally to thereby drive the drum 18 and the mirror 12 mounted fixedly therein rotationally in accordance with a desired and variable speed. The drive wheel 40 may vary widely in diameter if necessitated by particular requirements of specific applications, but in one embodiment is approximately 9 inches in diameter. As the motor 24 turns the drive wheel 40, the drive wheel 40 drives the drum 18 rotationally about the longitudinal axis of symmetry 26, thus alternately exposing the cutouts 28 and 30 and the two sides 14 and 16 of the mirror 12 to signals projecting through the cut-outs 28 and 30. Although the motor 24 and drive wheel 40 have been shown as the means for driving the drum 18 rotationally, a wide variety of drive implements may be employed to accomplish rotational movement of the drum 18.

In operation, as the drum 18 is driven rotationally about the axis of symmetry 26 by the motor 24 and drive wheel 40, a signal or image is received initially through the first cut-out 28 in the drum 18. The image or signal is then reflected from the first side 14 of the mirror 12 to the first antenna 20. After the drum has rotated approximately 180 degrees the same or a slightly different image or signal will be received through the second cut-out 30 in the drum 18 and reflected from the second side 16 of the mirror 12 to the second antenna 22. Accordingly, with each revolution of the drum 12 two image scans rather than one take place, with only one image scan per revolution of the mirror typically being the case with previously designed imaging systems.

The apparatus 10 of the present invention effectively doubles the refresh rate of any scanned image over what would normally be provided by previously designed imaging systems using only a single sided mirror for any given rate of rotation of the drum 18. The significantly increased refresh rate enables the apparatus 10 of the present invention to be used in connection with high speed moving platforms, such as on airborne vehicles, for example, helicopters and airplanes, where the image scanned may be changing rapidly, and where the mirror is required to be rotated at a speed in relation to the speed of the vehicle. Conversely, since the apparatus 10 takes two image scans for each revolution of the mirror, the mirror 12 of the apparatus 10 need only be rotated at half the speed of previously designed imaging systems of the same aperture diameter to provide the same degree of refresh rate and image resolution.

A further advantage of the apparatus 10 of the present invention is that antennas 20 and 22 do not rotate with the mirror 12 as would the antenna of previously designed imaging systems. With such heretofore designed systems the entire assembly (i.e., including antennas) must be rotated to provide for sweeps of a scene. This requires a rotating joint in the waveguide feed of the antenna. By rotating the drum 18 independently of the antennas 20 and 22, the need for a rotating wave guide feed is eliminated. This further provides the advantage of being able to incorporate larger antennas and/or mirrors into the imaging system which might otherwise be too large to be practically incorporated in imaging systems rotating at the rotational speeds necessary to achieve acceptable scanning refresh rates.

Yet another advantage of the apparatus 10 of the present invention is the ability to receive signals at two different frequencies. By setting up each of the two antennas 20 and 22 to receive a different frequency, a limited multispectral capability is afforded.

Those of ordinary skill in the art will also appreciate that there will be two rotational angles at which one or the other of the two antennas 20 and 22 is looking back at the mounting platform 36. A piece of microwave absorber could be placed on the mounting platform 36 so that the field of view of the mirror 12 is filled by an emitter of known temperature. A known reference reading may then be obtained from the absorber and a single point reference calibration value obtained for each scan (i.e., two times per revolution of the drum 18).

Additionally, since the polarization of the millimeter wave signal received by the system is changing during the rotation of the mirror 12, a conventional orthomode transducer could be used at the circular receiver horn of each of the antennas 20 and 22 to separate out both polarizations. The two signals may then be detected separately and combined later to obtain the total signal, or the two polarizations could be viewed individually.

Figure 4:
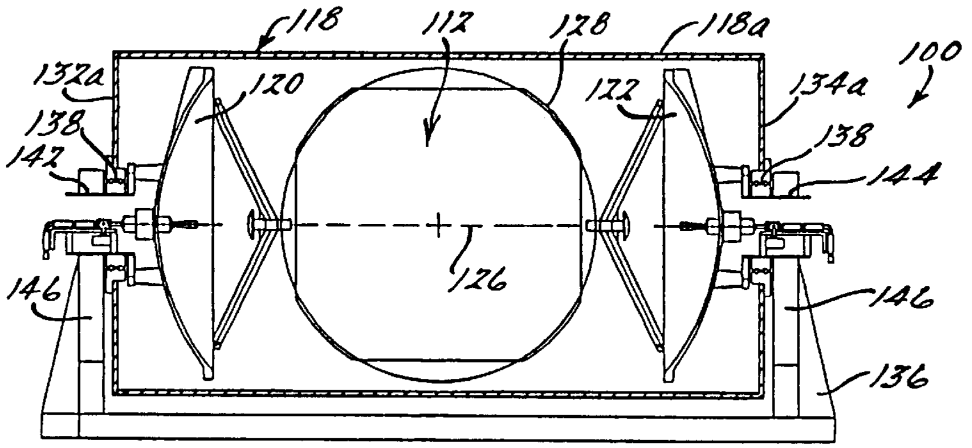
FIG. 4 is a partial cross sectional view of a rotating drum radiometer imaging apparatus in accordance with another embodiment of the present invention showing the antennas and the drum of the apparatus in cross section.
Figure 5:
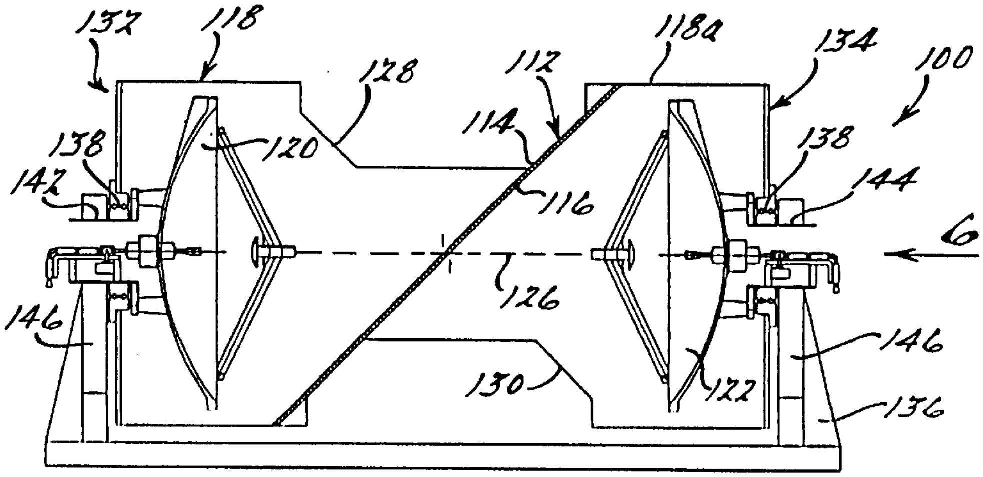
FIG. 5 is a cut-away view of the apparatus of FIG. 4 with the drum of the apparatus of FIG. 4 rotated 90° from the orientation showing FIG. 4.
Figure 6:
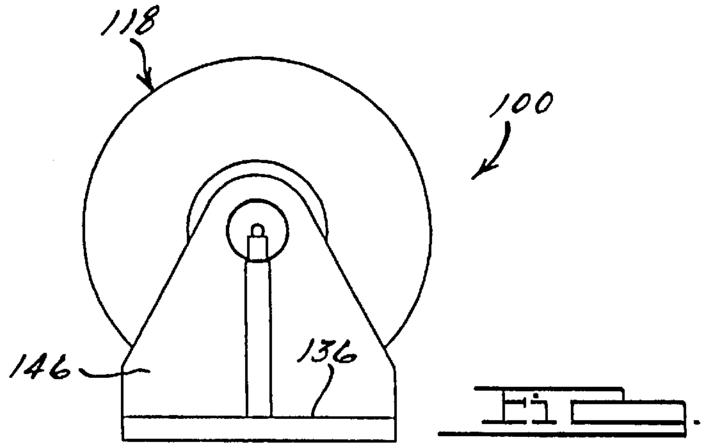
FIG. 6 is an elevational end view of the apparatus of FIGS. 4 and 5 in accordance with directional arrow 6 of FIG. 5.

Referring now to FIGS. 4 through 6, an apparatus 100 in accordance with an alternative embodiment of the present invention is shown. Apparatus 100 is identical in all respects with apparatus 10 with the exception of how its drum is mounted for rotation and rotationally driven. Thus, the components of apparatus 100 are labeled with reference numerals corresponding to like components of apparatus 10 and increased by 100.

As shown in FIGS. 4 and 5, the drum 118 includes within it the two sided mirror 112, which is fixedly mounted relative to the drum 118. The drum 118 is supported at its ends 132 and 134 by bearings 138 and rotated on axles 142 and 144 extending through openings in closed side ends 132*a* and 134*a* of the drum 118. The drum 118 is supported elevationally by upright members 146 which support the axles 142 and 144, and thus the drum 118, above the mounting platform 136. The antennas 120 and 122, as described above in connection with the antennas 20 and 22, which may be of the dish type or an imaging array, are still fixedly secured to portions of the mounting platform 136 via the mounting members 146 and axles 142 and 144. The antennas do not rotate relative to the mounting platform 136, but are instead disposed within the drum 118; only the drum 118 rotates relative to the mounting platform 136. Thus, the drum 118 may be rotated about axles 142 and 144 and the mirror 112 driven rotationally about the longitudinal axis of symmetry 126 while the antennas 120 and 122 remain fixed.

One of the mounting members 146 is shown elevationally in the end view of FIG. 6. For purposes of clarity, the motor and drive wheel of embodiment 100 have not been illustrated in FIGS. 4 through 6 so that the structure relationally supporting the drum 118 may be seen more clearly. It will be appreciated, however, that a motor, such as motor 24, and a drive wheel, such as drive wheel 40, are incorporated in the embodiment 100 illustrated in FIGS. 4 through 6 to rotationally drive the drum 118.

It is anticipated that embodiment 100 may be easier to manufacture and/or assemble with the antennas 120 and 122 disposed within the drum 118, and the drum mounted for rotational movement about axles 142 and 144. Additionally, embodiment 100 provides a slightly more compact configuration with the antennas 120 and 122 disposed within the drum 118. The apparatus 100 otherwise operates identically to apparatus 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for receiving a signal, said method comprising:

providing a two-sided mirror, mounted for rotation about a longitudinal axis of symmetry extending through said two-sided mirror at approximately a 45 degree angle relative to first and second reflective surfaces of said two-sided mirror;

positioning a pair of imaging arrays at opposite ends of said two-sided mirror such that a geometric center of each said predetermined antenna is positioned along said longitudinal axis of symmetry of said two-sided mirror;

rotating said two-sided mirror to cause said signal to be received and reflected from said first reflective surface of said two-sided mirror to a first one of said predetermined antennas;

rotating said two-sided mirror approximately 180 degrees; and causing said signal to be reflected from said second reflective surface of said two-sided mirror to a second predetermined antenna.

2. A method as recited in claim 1, wherein said imaging array is a single dimension array.

* * * * *